June 2, 1931.  R. K. MOORE  1,807,793
TRUCK WITH CONVERTIBLE WHEEL STRUCTURE AND COOPERATING JACK MEANS
Filed Oct. 13, 1930  2 Sheets-Sheet 1
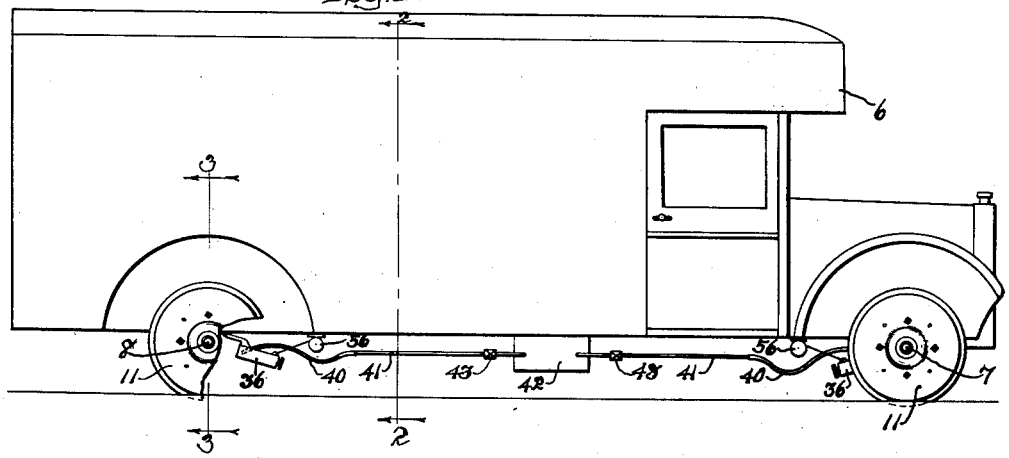
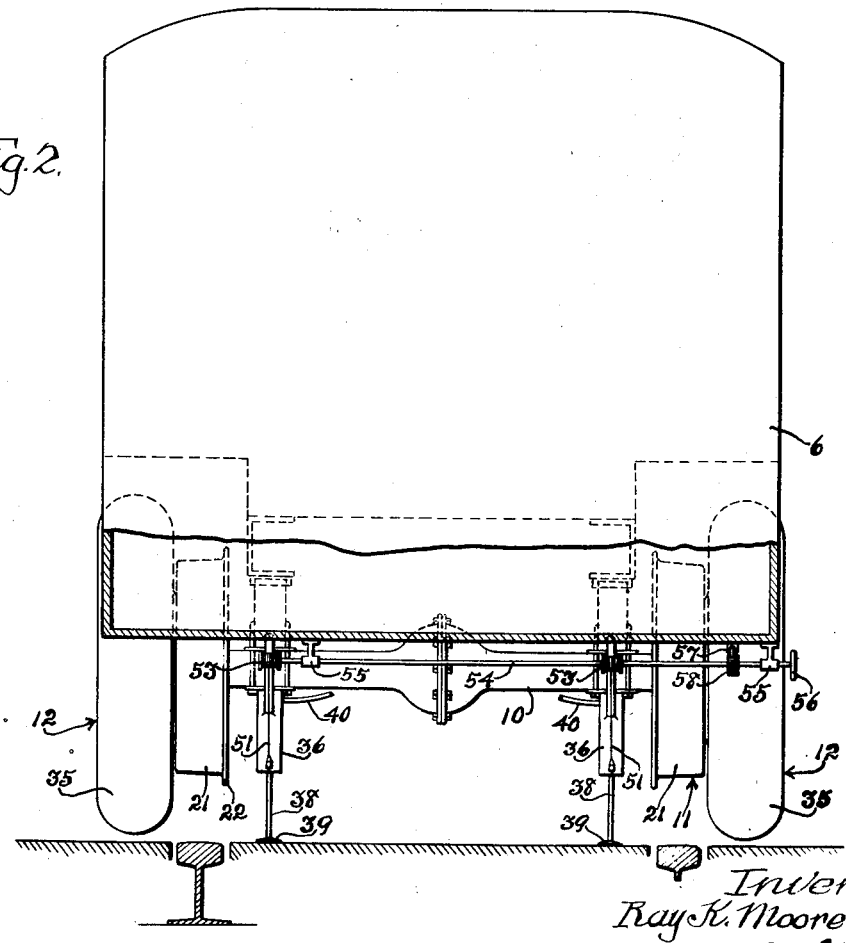
Inventor:
Ray K. Moore
By J. Daniel Stuwe
Atty.

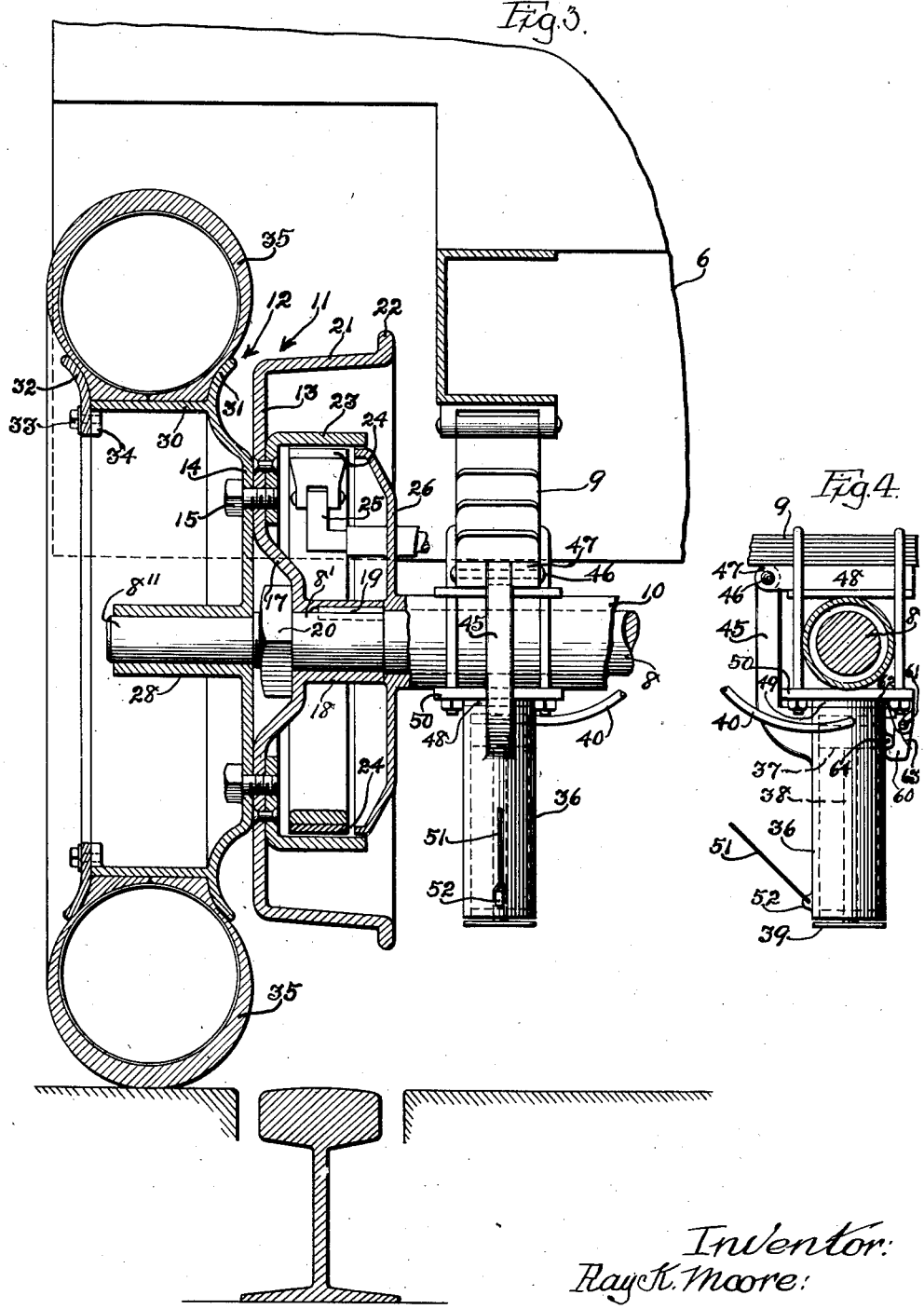

Patented June 2, 1931

1,807,793

UNITED STATES PATENT OFFICE

RAY K. MOORE, OF FREEPORT, ILLINOIS, ASSIGNOR OF ONE-HALF TO WILLIAM J. LAFFEY, OF CHICAGO, ILLINOIS

TRUCK WITH CONVERTIBLE WHEEL STRUCTURE AND COOPERATING JACK MEANS

Application filed October 13, 1930. Serial No. 488,358.

This invention relates to a truck with convertible wheel structure and cooperating jack means.

One of the main objects of this invention is to provide a particularly useful and practical truck or vehicle which can, with but very little labor and energy, be quickly and easily converted or arranged so as to be well adapted for traveling either upon the railway or on the highway; so that the vehicle is adapted for traveling on the existing railways for any long hauls, as from city to city, and is also adapted for traveling on the highway or pavement, so that the conveyed material can be delivered, without reloading, directly at the door of the place of business located in any part of the city and away from the railway.

Another object is to provide a truck or vehicle with a convertible wheel structure, also with permanent jack means whereby the truck or vehicle may be readily lifted, so that said wheel structure may be conveniently converted from one form to another.

A further object is to provide a novel wheel structure for a vehicle, comprising permanent wheel means and auxiliary wheel means detachably mountable or securable together, in such a manner that the vehicle may be readily arranged and adapted for use either on the railway or on the highway.

These and other objects and advantages are attained with this invention, as will become apparent from the following description, taken in connection with the accompanying drawings, in which,—

Fig. 1 is a side elevation of a truck or vehicle, showing my invention in its preferred form applied thereto, and arranged for traveling on the railway.

Fig. 2 is an enlarged vertical cross-sectional view, taken on line 2—2 of Fig. 1, showing the wheel structure arranged for traveling on the highway, and the vehicle elevated by the jack means, to facilitate such arranging of the wheel structure, the upper part of the vehicle body being shown in outline.

Fig. 3 is an enlarged vertical cross-sectional view, taken on line 3—3 of Fig. 1, showing the wheel structure arranged for traveling on the highway, and the jack means in its idle position ready to be swung upwards into the inoperative position as indicated in Fig. 1.

Fig. 4 is an elevational view of the jack means mounted on the truck, showing the same in the release position and at right angles to the view shown in Fig. 3.

The drawings illustrate an embodiment of this invention in the preferred form of construction, wherein the vehicle is shown in the form of a motor vehicle or truck which has its body 6 suitably mounted upon a front axle 7 and a rear axle 8, said axles being supported upon the improved wheel structures arranged in accordance with this invention.

As best shown in Fig. 3 of the drawings, the rear part of the body 6 is supported by means of a suitable spring 9, which is mounted on an axle housing 10, wherein the rear axle 8 rotates. This axle has an end portion 8' and an end portion 8" extending therebeyond, providing a relatively long wheel-receiving portion at the end, to adapt the same for mounting my combined convertible wheel structure thereon.

My novel wheel structure is arranged to be readily convertible, so that it may be employed for use either on the railway rails or on the usual highway. The particular form shown herein comprises two practically complete wheel members, both being substantially cup-shaped, and including an inner wheel member 11 and an outer wheel member 12. These wheel members have end portions 13 and 14 respectively, which are provided with registering openings therein for receiving stud bolts 15 to secure said wheel members together.

For the purpose of mounting these wheel members on the axle, the end portion 13 of wheel member 11 preferably has its middle part bent inwardly, so as to provide a dished portion 17, and therefrom a hub or sleeve 18 extends which embraces the inner end part 8' of the axle. A key 19 or other suitable means is used to force this wheel member to rotate with the axle; and means, as a nut 20, is threaded on said end part 8', being housed in said dished portion 17, for securing this wheel member firmly on the axle. Said wheel member preferably has its outer or peripheral portion 21 arranged to form a substantially cylindrical tread portion which has a flange 22 extending radially from its free end, thereby providing a wheel member especially arranged for traveling on the rails of the railway.

Suitable brake mechanism is also provided, which may include a brake drum 23 secured in wheel member 11, and brake band means 24 engaging said brake drum, being actuated by suitable operating means 25, is provided to cooperate with said drum. A suitable closure member or disk 26, which extends from housing 10 to the inner end of the drum 23, protects the brake mechanism.

The outer wheel member 12, of this illustrated form of my invention, is arranged for traveling on the highway, and it has its inner end 14 releasably secured to the outer end 13 of the inner wheel member 11, by means of said bolts 15, as set forth above. A hub or sleeve 28 extends outwardly from said end 14, and it embraces the outer wheel-receiving end part 8″ of the axle, to support the same and avoid placing shearing strain on said bolts.

The highway wheel preferably has its outer, cylindrical portion 30 provided with an outwardly extending integral flange 31, at its side adjacent wheel member 11, also an outwardly extending flange portion 32 which is detachably secured by bolts 33 to lugs 34 provided on the inward side of portion 30. Pneumatic tire means 35 is thereby detachably mounted between said flanges 31 and 32, thus providing a substantially complete wheel member for use on the pavement or highway.

With this combination, convertible wheel structure, a vehicle is provided wherein the highway wheel members 12 are readily removed, and the railway wheel members 11 are utilized, whereby to adapt the vehicle for travel on the existing railways, during any long and extended hauls, so as to conserve driving power and to gain speed and time in the transportation of material. When the city or place of destination is reached, and it is desired to deliver or unload the freight or material, which is being hauled, directly into the particular warehouse or place of business, then the highway wheel members 12 can be readily applied and the vehicle can travel over the suitable paving means invariably provided at the crossings of the highways with the railways and which continue through the city up to the place of delivery; thereby enabling the delivery to be made from this rail-traveling freight vehicle directly at the place of business located anywhere within the heart of the city and away from the railway.

Jack means is preferably provided on the vehicle, and is permanently mounted thereon, whereby to quickly jack or lift said vehicle, in order to facilitate converting the wheel structure from one form to the other.

In the form of my invention illustrated in the drawing, the jack means comprises a plurality of jacks or members 36 which are preferably actuated by fluid-pressure, each member being cylindrical in form and having a piston 37 therein with a piston rod 38 which carries a supporting plate or foot 39 at its lower end, for bearing on the highway or pavement to lift the vehicle, as indicated in Fig. 2 of the drawings. A suitable hose 40 is connected with the cylindrical jack and with a conduit 41 which leads from a suitable fluid-pressure reservoir or containing member, as a pressure tank 42, which is mounted on the vehicle; and valve means 43 is provided in said conduit, to apply and control the fluid-pressure and to utilize said jack members whenever desired.

Means is provided for permanently mounting the jacks on the vehicle so that each jack can be readily lowered or swung into an operative position under the axle, and near to a wheel. This mounting means as illustrated includes an arm or bracket member 45 extending laterally from each jack and then upwardly, its upper end being pivotally mounted with a pin 46 onto lug means 47 provided on a base plate or bar 48 which is positioned at the base of the vehicle spring 9 and rests upon the axle housing 10, as best shown in Fig. 4. Said mounting means brings the top end or head 49 of the lowered jack 36 to bear directly under a plate 50 which bears under the axle housing and is used in securing the spring 9 in position.

I provide means for readily and conveniently lifting the jack means and for carrying the same out of the way, and for again readily lowering the same into an operative position. In the present construction this means comprises a cable 51 having one end attached to an eye 52 at the lower end of a jack, and having its other end wound on a spool 53 secured on a rod or shaft 54 which is journaled in bracket means 55 mounted on the body 6 and is actuated by a hand-wheel 56. A pawl 57 and ratchet member 58 retain the shaft and drum in position and the jack elevated in an out-of-the-way position.

Means is preferably also provided for holding the jack stationary in its lowered or operative position, in order to avoid tilting and releasing of the jack in case the vehicle should vibrate or attempt to move while it is being lifted by the jack, as when located on a grade or incline. This means may be in any suitable form, being indicated as a pawl 60 pivoted with a pin 61 on a lug 62 provided under plate 50, and being resiliently urged by the lower part of a suitable spring 63 mounted on said pin, to hold the lower hook-end of said pawl under a projecting nose or lug 64 provided at the side of the jack.

With this arrangement, as soon as the jack is lowered or dropped, it is automatically engaged and securely held in its lowered or operative position by said pawl 60, and when the fluid-pressure is released or withdrawn from the jack, and the pawl is purposely withdrawn from said lug 64, the jack will swing or tilt upon pivot pin 46, due to the arm 45 being offset, whereupon the jack may be readily raised by the winding of the cable.

Although I have illustrated my invention in a particular form of construction, it is to be understood that various changes and modifications may be made therein without departing from the spirit of this invention, and I do not purpose limiting myself to this particular construction or in any manner, except as necessitated by the prior art.

I claim as my invention:

1. A vehicle comprising an axle with an extended end part for receiving my wheel structure, a convertible wheel structure comprising a wheel member having a hub mountable on said axle and providing a substantially complete wheel for travel on the railway, and another wheel member having a hub supportable on the extended shaft part and having resilient tire means for traveling on the highway, said wheel members being readily securable together and the outer wheel member being again readily detachable from the inner one.

2. A vehicle comprising an axle with an extended end part, a convertible wheel structure including an inner wheel member and an outer wheel member which have the ends arranged to be detachably secured together, readily releasable means for securing said ends together, the inner wheel member having its central part dish inwardly and continuing as a hub for embracing the axle, securing means on the axle, positioned within said dished part, to hold the inner wheel member in place, peripheral flange means on said inner wheel member to adapt it for use on the railway, hub means on the outer wheel member to bear on the extended end part of the axle, and yieldable tire means and means for detachably retaining it on the outer wheel member to adapt it for the highway.

3. A convertible wheel structure comprising an inner wheel member including an end part and a tread part with a radial flange to adapt it for use on the railway, central hub means extending inwardly from said end part for mounting said wheel member on an axle, an outer wheel member having an end part for engaging the end part of the inner wheel member, means for detachably securing said end parts together, and resilient means on said outer wheel member to adapt said structure for travel on the highway.

4. A convertible wheel structure comprising a substantially cup-shaped wheel member including an outer end part having an inwardly extending hub for supporting said member on an axle, also having radially extending flange means to adapt said member for use on the railway, an outer wheel member having an end part to engage the first said end part of the other wheel member and having an outwardly extending hub to engage the axle, means for readily securing said wheel members together and to permit convenient detachment of the outer wheel member, and yieldable tire means and means for detachably mounting it on said outer wheel member whereby to adapt said wheel structure for traveling on the highway.

In testimony whereof I have signed this specification.

RAY K. MOORE.